(12) United States Patent
Harper et al.

(10) Patent No.: US 7,344,045 B2
(45) Date of Patent: Mar. 18, 2008

(54) CONTAINER FOR HOLDING A CRYOGENIC FLUID

(75) Inventors: Gregory C. Harper, Vancouver (CA); Justin Gish, Mobile, AL (US)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 10/950,305

(22) Filed: Sep. 23, 2004

(65) Prior Publication Data

US 2005/0139600 A1 Jun. 30, 2005

(51) Int. Cl.
*F17C 1/12* (2006.01)
(52) U.S. Cl. .............................. 220/560.09; 220/560.1; 220/62.18
(58) Field of Classification Search ............. 220/62.18, 220/560.1, 560.09, 560.11, 560.14, 560.05, 220/901, 908
See application file for complete search history.

(56) References Cited

U.S. PATENT DOCUMENTS

| | | | |
|---|---|---|---|
| 1,979,221 A | | 10/1934 | Dana |
| 3,119,238 A | | 1/1964 | Chamberlain et al. |
| 3,132,762 A | * | 5/1964 | Gabarro et al. ........ 220/560.05 |
| 3,273,740 A | * | 9/1966 | Herrenschmidt ....... 220/560.05 |
| 3,339,515 A | * | 9/1967 | Reed ........................ 114/74 A |
| 3,341,215 A | | 9/1967 | Spector |
| 3,425,583 A | * | 2/1969 | Bridges ................. 220/560.05 |
| 3,425,585 A | | 2/1969 | Latham |
| 3,446,388 A | * | 5/1969 | Greenberg .................. 220/562 |
| 3,481,505 A | | 12/1969 | Nason et al. |
| 3,487,971 A | * | 1/1970 | Gay et al. ................. 220/560.1 |
| 3,698,200 A | * | 10/1972 | Johnson et al. .............. 62/50.2 |
| 3,705,498 A | | 12/1972 | DeHaan |
| 3,782,128 A | | 1/1974 | Hampton et al. |
| 3,905,508 A | * | 9/1975 | Hibl et al. .................. 220/476 |
| 3,948,411 A | | 4/1976 | Conte |
| 4,000,826 A | | 1/1977 | Rogers |
| 4,038,832 A | | 8/1977 | Lutgen et al. |
| 4,098,426 A | | 7/1978 | Gerhard |
| 4,156,492 A | * | 5/1979 | Cavanna et al. ......... 220/560.1 |
| 4,292,062 A | | 9/1981 | Dinulescu et al. |
| 4,343,413 A | | 8/1982 | Chatzipetros et al. |
| 4,394,929 A | | 7/1983 | Patel et al. |
| 4,428,204 A | * | 1/1984 | Brister ........................ 62/62 |
| 4,472,946 A | | 9/1984 | Zwick |
| 4,487,332 A | * | 12/1984 | Huang ..................... 220/560.1 |
| 4,496,073 A | | 1/1985 | Silver et al. |
| H80 H | | 7/1986 | Lewis |
| 4,625,753 A | | 12/1986 | Gustafson |

(Continued)

*Primary Examiner*—Stephen J. Castellano
(74) *Attorney, Agent, or Firm*—McAndrews, Held & Malloy, Ltd.

(57) ABSTRACT

A double-walled vacuum-insulated container for holding a cryogenic fluid comprises a support structure for supporting an inner vessel within an outer vessel. The container has an elongated horizontal axis. A conduit extending between the inner and outer vessels has a wall thickness that allows the conduit to carry a substantial portion of axial loads acting on the inner vessel in a direction parallel to the horizontal axis. The support structure further comprises a non-metallic support spanning between the inner and outer vessels, with the non-metallic support capable of transferring substantially all radial loads transverse to said horizontal axis. The non-metallic support is also fixedly attached to the inner and outer vessels so that it is capable of supporting a substantial portion of the axial loads so that the non-metallic support and the conduit cooperate to provide support in the axial direction.

31 Claims, 3 Drawing Sheets

U.S. PATENT DOCUMENTS

| | | | |
|---|---|---|---|
| 4,674,289 A * | 6/1987 | Andonian .................... 62/47.1 |
| 4,718,239 A | 1/1988 | Nowobilski et al. |
| 4,877,153 A | 10/1989 | Varghese et al. |
| 4,918,927 A | 4/1990 | Eigenbrod |
| 4,976,110 A | 12/1990 | Reid |
| 5,012,948 A | 5/1991 | Van Den Bergh |
| 5,085,343 A * | 2/1992 | Scarr ....................... 220/560.1 |
| 5,386,699 A | 2/1995 | Myers et al. |
| 5,533,340 A * | 7/1996 | Shama et al. ................. 62/45.1 |
| 5,651,473 A * | 7/1997 | Preston et al. ........... 220/560.1 |
| 5,651,474 A * | 7/1997 | Callaghan et al. .......... 220/565 |
| 5,954,101 A | 9/1999 | Drube et al. |
| 6,047,747 A | 4/2000 | Bowen |
| 2002/0011491 A1 * | 1/2002 | Rosen et al. ............... 220/4.14 |

* cited by examiner

CONTAINER FOR HOLDING A CRYOGENIC FLUID

FIELD OF THE INVENTION

The present invention relates to a container for holding a cryogenic fluid. More particularly, this invention relates to a heat insulated double-walled container with a combined support and fluid conduit structure for suspending an inner vessel within an outer vessel, for reducing heat transfer and allowing longer holding times.

BACKGROUND OF THE INVENTION

Developments in combustion engine technology have shown that compression ignition engines, frequently referred to as diesel-cycle engines, can be fuelled by gaseous fuels instead of diesel without sacrifices in performance or efficiency. Examples of such fuels include natural gas, methane, propane, ethane, gaseous combustible hydrocarbon derivatives, hydrogen, and blends thereof. Substituting diesel with such gaseous fuels generally results in cost, availability and emissions benefits over diesel.

However, one challenge in using gaseous fuels for such applications is that the energy density of gaseous fuels is not as high as conventional liquid fuels. This is an important consideration, for example, with gaseous fuel systems employed for vehicular applications, because fuel storage space on-board a vehicle is limited. For gaseous-fuelled vehicles to be attractive versus conventional diesel-fuelled vehicles, the on-board fuel storage system should not diminish the vehicle's transport capacity or range.

To increase the energy density of a gaseous fuel, it can be stored at high pressure. To contain a gas at high pressure, a pressure vessel rated for a specified maximum holding pressure must be used. For gaseous fuels, compared to a compressed gas, higher energy densities can be achieved at lower storage pressures with a liquefied gas. As a result, the fuel tank does not need to be rated for as high a pressure, which can reduce the weight of the fuel tank.

Accordingly, a preferred method of increasing the energy density of a gaseous fuel is to store it in a liquefied state at cryogenic temperatures. A liquefied gas stored at a cryogenic temperature is referred to herein as a cryogenic fluid and a gaseous fuel stored in a liquefied state at a cryogenic temperature is referred to herein generally as a "cryogenic fuel".

For the purposes of this application, cryogenic fuels include liquefied gaseous fuels that boil at temperatures at or below −100° C. under atmospheric pressures. An example of such a fuel is liquefied natural gas, commonly known as "LNG".

In the present disclosure LNG is referred to as a preferred example of a cryogenic fuel because of the vast proven reserves of natural gas in many of the potential markets around the world, the affordability of natural gas, and the already existing infrastructure for natural gas, which is continuing to expand in breadth and capacity.

However, people skilled in the technology would understand that the presently disclosed storage container can be employed to hold other cold or cryogenic fuels or liquefied gases generally. By way of example, the disclosed storage container could be employed to accommodate other hydrocarbons such as methane, ethane, propane and hydrocarbon derivatives or non-organic fuels such as hydrogen. Furthermore, the container that is the subject of this disclosure can also be used to hold other liquefied gases at cryogenic temperatures, such as helium, nitrogen and oxygen.

However, one of the challenges of storing liquefied gas at cryogenic temperatures is reducing heat transfer into the cryogen space. As the temperature of the liquid increases, the vapour pressure rises inside the storage container. Cryogenic storage containers are normally equipped with a pressure relief venting system to prevent over-pressurization of the storage container. Excessive heat transfer into a cryogen space can result in fuel wastage through venting. When the liquefied gas is a fuel, it is also undesirable to routinely release fuel into the environment. With natural gas used as an example, methane, a major component of natural gas, is a greenhouse gas.

Cryogenic storage containers commonly use a double-walled construction with an inner vessel, which holds the liquefied gas, suspended inside an outer vessel. A vacuum applied to the space between the inner vessel and the outer vessel minimizes or reduces conductive and convective heat transfer. It is also known to wrap sheets of a super-insulating material around the inner vessel to minimize or reduce radiant and convective heat transfer. However, the structural supports for the inner vessel, as well as piping between the inner vessel and outside environment, provide heat conduction paths and the transfer of heat energy to the liquefied gas in the cryogen space from the outside environment is commonly known as "heat leak".

As long as there are structural supports for the inner vessel and there are pipes or conduits that penetrate through the insulated space, some heat leak will occur. "Holding time" is defined herein as the time span that a cryogen can be held inside the storage container before heat leak into the cryogen space causes the vapour pressure to rise to a level at which the pressure relief valve opens. Accordingly, holding times can be extended without the need to vent excess vapour pressure if heat leak can be reduced.

For containers with an elongated horizontal axis, much of the conventional technology for supporting the inner vessel suspended inside the outer vessel was developed for relatively large storage tanks such as ones that are used for bulk transport of a cryogen onboard a ship, train, or trailer, or for a stationary storage vessel used at a dispensing station. The smallest of these types of containers typically has a volumetric capacity that is greater than 3,500 liters, and some of the larger bulk storage containers can have a volumetric capacity that is greater than 380,000 liters. With such large storage tanks, a higher amount of heat leak can be accepted because the volume of the container and the mass of the cryogen stored therein is orders of magnitude greater than that which is associated with a smaller vehicular fuel tank, which typically has a volumetric capacity of 450 liters or less. That is, a larger mass of cryogen stored in a larger container can absorb a much greater amount of heat before the vapour pressure rises to a predetermined relief pressure, compared to a smaller mass of cryogen stored in a smaller container. If conventional technology for supporting the inner vessel of a large storage tank is applied to a smaller container, the heat leak into the cryogen space through the support structure could result in shorter holding times, compared to the holding times that can be achieved when the same type of support structures are used for a larger tank, even when the support structure for the smaller vessel is appropriated scaled in size. Such shorter holding times may not be acceptable depending upon the application for the smaller vessel. For smaller containers such as vehicular fuel tanks longer holding times are advantageous, and it is desirable to have support structures that can provide reduced heat leak, compared to conventional inner vessel support structures designed for much larger storage containers.

Compared to conventional liquid fuels like diesel oil and gasoline, the use of fuels stored on-board a vehicle at cryogenic temperatures is relatively new. Now that relatively small containers for cryogenic fluids are being considered for this mobile application, conventional support structures originally designed for larger bulk storage containers have been adapted. With larger containers the structural support that can be provided by piping between the inner and outer vessel is ignored since it is nominal, as is the heat leak that can occur through such pipes, given the size of such containers and the mass of cryogen held therein. For smaller containers, the thermal conductivity through the pipes that penetrate through the insulated space can be considerable, especially since pipes are typically made from metallic materials that have significant thermal conductivity. Accordingly, to improve the holding time, improvements are needed to reduce the heat leak into smaller containers that can be used to store a fuel on-board a vehicle at cryogenic temperatures.

There are known containers for holding a cryogenic fluid that are smaller than the bulk transport containers described above, but these containers generally have a vertical longitudinal axis, with the fluid connections into the inner cryogen space associated with the top of the container. Because the vapour space occupies the upper region of these vertically oriented containers, the heat leak through the conduits at the top of the container is reduced because all or at least a part of the conduit is not in direct contact with the cryogenic liquid. The support structures for the inner vessel of a double-walled vacuum insulated container are dependent in part upon the configuration of the container and whether the container is designed for stationary or mobile use. Accordingly, although there are known containers with a volumetric capacity that is generally the same as that required for storing a cryogenic fuel on-board a vehicle, these known containers are not suitable for this relatively new application. For example, containers with a vertical longitudinal axis are not suitable for mounting on-board a vehicle at the location where fuel tanks are normally mounted, and containers intended for stationary use are not suitable for mobile use because of the dynamic loads that must be carried by the support structure for the inner vessel.

SUMMARY OF THE INVENTION

A double-walled vacuum-insulated container for holding a cryogenic fluid is disclosed that comprises a support structure for supporting an inner vessel within an outer vessel. The container comprises:

(a) an inner vessel defining a cryogen space and having a horizontal elongated axis.
(b) an outer vessel surrounding the inner vessel, defining an evacuatable space between the outer vessel and the inner vessel; and
(c) a structure for supporting the inner vessel within the outer vessel.

The support structure comprises a conduit attached at a first point to an inner vessel support bracket associated with the inner vessel, and attached at a second point to an outer vessel support bracket for the outer vessel. The conduit is capable of carrying a substantial portion of axial loads acting on the inner vessel in a direction parallel to the horizontal axis. The cryogenic fluid can be conveyed into and/or out of the cryogen space through the conduit. The support structure further comprises at least one non-metallic support spanning between the inner vessel and the outer vessel. The non-metallic support has bearing surfaces associated with respective opposite facing surfaces associated with the inner vessel and the outer vessel for transferring substantially all radial loads transverse to the horizontal axis from the inner vessel to the outer vessel. The non-metallic support is fixedly attached to the opposite facing surfaces whereby the non-metallic support is capable of supporting a substantial portion of the axial loads.

A "substantial portion" of the axial loads is defined herein as a portion of the axial load that the container is designed to carry that allows the strength of the other axial supports to be reduced so that the conduit and the non-metallic support cooperate to collectively provide the axial loads that the container is designed to carry. Conventional conduits are not designed to carry axial horizontal loads and so the structural support provided by a conventional conduit would be negligible. Accordingly, a conduit that is designed to carry a substantial portion of the axial loads has a wall thickness that is thicker than a conventional conduit that acts only to convey cryogenic fluid into or out of the cryogen space.

While the conduit is fixedly attached to the inner and outer vessels, the amount of radial loads that it can carry is negligible. Because the container is horizontally oriented and supported from the sides, the non-metallic support must be designed to carry the full weight of the inner vessel in the radial direction when the container is filled with cryogenic fluid. The wall thickness of the conduit would have to be much greater to provide a substantial amount of support in the radial direction and this would cause too much heat leak. In the disclosed container, the one or more non-metallic supports carry substantially all of the radial loads. The non-metallic support preferably has a thermal conductivity less than a substitute support made from a ferrous material with at least the same structural strength.

The opposite facing surface associated with the inner vessel can be provided by the inner vessel support bracket and the opposite facing surface associated with the outer vessel can be provided by the outer vessel support bracket. That is, the support structure for the conduit can be integrated with the support structure for the non-metallic support. For example, the non-metallic support can be tubular in shape, extending between the brackets with the conduit extending through the hollow interior of the non-metallic support.

There can be a plurality of non-metallic supports of which the at least one non-metallic support is a first non-metallic support associated with a first side of the inner vessel that is intersected by the horizontal axis. By way of example, a second non-metallic support can be associated with a second side of the inner vessel, opposite to the first side. In this example, the first and second non-metallic supports together are sized to provide the strength needed to carry substantially all of the radial loads.

In one embodiment, the second non-metallic support has at least one bearing surface that is slidable in a direction parallel to the horizontal axis relative to the respective opposite facing surface of the inner or outer vessel, whereby the second non-metallic support is capable of providing radial support but not axial support.

The opposite facing surfaces associated with the first and second sides of the inner vessel can be provided by walls of respective cup-shaped inner support structures projecting into the cryogen space. The opposite facing surfaces associated with the outer vessel can be provided by walls of opposite cup-shaped outer support structures projecting from the outer vessel and aligned with the cup-shaped inner support structures. The first and second non-metallic supports can each comprise a cylindrical member with a first end disposed in a respective one of the cup-shaped inner support structures and a second end disposed in a respective one of the cup-shaped outer vessel support structures. The inner vessel support bracket can be advantageously integrated with the cup-shaped inner support structure, and similarly, the outer vessel support bracket can be integrated with the cup-shaped outer support structure.

The conduit preferably has a length between the first and second points that provides a heat path between the inner vessel and the outer vessel that is longer than the axial spacing between the inner vessel and the outer vessel.

The conduit can be made from a metallic material. The metallic conduit can be welded at the first and second points to the inner vessel support bracket and to the outer vessel support bracket, respectively.

The conduit can span between the outer vessel and the inner vessel with an alignment that is parallel to the horizontal axis. Inside the cryogen space the conduit can bend and slope downward, before bending upwards so that it has an open end near the top of the cryogen space.

The first point, where the conduit is fixedly attached to the inner vessel support bracket, can be associated with a location along the conduit where it is sloping downward. Since this location for the first point is inside the cryogen space, it provides a heat transfer path that is longer than the axial distance between the inner vessel and the outer vessel. It is also desirable to thermally insulate a portion of the sloped conduit to prevent convective currents inside the conduit.

The container can further comprise a collar support that prevents movement of the conduit in a radial direction near where it bends downwards. The collar support is disposed in the evacuatable space and the collar support and provides structural support to the conduit from the inner vessel support bracket directly or through the non-metallic support. If the support collar is next to the non-metallic support, the non-metallic support provides a thermal break. The support collar can itself also be made from a non-metallic thermally insulating material. In another embodiment, the collar support can be located on the downward sloping portion of the conduit.

In preferred embodiments the non-metallic supports are made from a composite material comprising fibres disposed within a plastic matrix. Those skilled in the knowledge of composite materials will understand that it is possible to choose from many types of fibres and plastics and that the choice of materials determines the properties of the composite material. In the present case, two important properties for the composite material that is employed for providing support for the inner vessel are strength and thermal conductivity under the anticipated operating conditions. That is, an objective of using a non-metallic composite material is to reduce heat leak into the cryogen space. Accordingly, it is desirable for the composite material to have a lower thermal conductivity than ferrous support members used in conventional containers. Even though the heat transfer coefficient of a composite is less than ferrous materials, the overall thermal conductivity can be greater if the composite material is not as strong and a composite structural member with a larger heat conducting cross-sectional area is needed. Therefore, a combination of strength and a low heat transfer coefficient is needed to achieve the desired result and the non-metallic supports preferably have a thermal conductivity that is less than a substitute support made from a ferrous material with at least the same structural strength.

Composite materials for the non-metallic support for the inner vessel can comprise fibres selected from the group consisting of glass, carbon, synthetic fibres made from a resin, and quartz. An example of a synthetic fibre made from a resin would be aramid fibres such as the material sold by E.I. Dupont de Nemours and Company under the trade name Kevlar®. An epoxy resin can be employed to provide the plastic matrix. The epoxy resin preferably has a cure temperature that is greater than 175° C. (about 350° F.) so that the non-metallic members will not be damaged when the container is heated to create an insulating vacuum in the evacuatable space between the inner and outer vessels. In other embodiments the plastic matrix can comprise bismaleimide or a thermoplastic selected from the group consisting of polyetheretherketone and polyphenylene sulfide.

Materials disposed in a vacuum can release gaseous elements and because the non-metallic supports are located within the evacuatable space, materials with low outgassing properties are preferred. One measure of outgassing is total mass loss ("TML") and a TML of less than 1% is preferred. Another measure of outgassing is collected volatile condensable material ("CVCM") and a CVCM less than 0.1% is preferred.

The container can further comprise a thermally insulated support sleeve extending between the outer vessel and the inner vessel, wherein the support sleeve is capable of carrying a substantial portion of the axial loads. Containers for holding cryogenic fluids can comprise a support sleeve for the primary purpose of allowing equipment such as a pump or instrumentation to be mounted inside the cryogen space. The support sleeve can also be employed to provide structural support to the inner vessel, allowing the strength of the other structural supports to be reduced by taking into account the strength contributed by the support sleeve. The insulated support sleeve can be thermally insulated by providing a double-walled structure with an evacuatable space that is connected to the evacuatable space that surrounds the inner vessel.

The support sleeve can comprise an inner tubular wall spaced apart from an outer tubular wall wherein the space between the inner and outer tubular walls is evacuatable together with the evacuatable space between the outer vessel and the inner vessel. A distal end of the support sleeve is disposed within the cryogen space defined by the inner vessel. The inner and outer tubular walls are joined together and sealed at or near the distal end, whereby cryogenic fluid from within the cryogen space is prevented from flowing into the space between the outer and inner tubular walls. A proximal end of the support sleeve is associated with the outer vessel and the inner vessel, whereby the outer tubular wall is structurally attached to the inner vessel and the inner tubular wall is structurally attached to the outer vessel.

A container for holding a cryogenic fluid comprises:
  (a) an elongated inner vessel defining a cryogen space and having a horizontal longitudinal axis;
  (b) an outer vessel surrounding the inner vessel, defining an evacuatable space between the outer vessel and the inner vessel; and
  (c) a structure for supporting the inner vessel within the outer vessel.

The structure comprises a metallic conduit extending between an outer vessel support bracket associated with the outer vessel and an inner vessel support bracket associated with the inner vessel. The metallic conduit is fixedly attached to the support brackets and capable of carrying a substantial portion of axial loads acting in a direction parallel to the longitudinal axis between the inner vessel and the outer vessel. The support structure further comprises first and second non-metallic supports associated with opposite first and second sides of the inner vessel. The opposite first and second sides are intersected by the longitudinal axis. The non-metallic supports are capable of carrying substantially all loads acting in a radial direction in relation to the longitudinal axis. At least one of the first and second non-metallic supports is fixedly attached to the inner and outer vessels and capable of carrying a substantial portion of the axial loads. Each one of the first and second non-metallic supports comprises a non-metallic member extending between the inner vessel and the outer vessel. The non-metallic members each comprise bearing surfaces associated with respective opposite facing surfaces of support structures associated with the inner vessel and the outer vessel.

A method is provided of supporting an inner vessel that defines a cryogen space within an outer vessel, and transferring axial and radial loads between the inner vessel and the outer vessel while reducing heat leak into the cryogen space. The axial loads are transferable in a direction parallel to an elongated horizontal axis of the inner vessel and the radial loads are transferable in a radial direction perpendicular to the horizontal axis. The method comprises evacuating a sealed space between the inner vessel and the outer vessel, transferring substantially all loads in the radial direction through at least one non-metallic structural member that has a lower thermal conductivity than a ferrous material with at least the same strength in the radial direction, transferring a substantial portion of loads in the axial direction through a conduit, and transferring a substantial portion of loads in the axial direction through the at least one non-metallic structural member. The at least one non-metallic structural member can be one of two non-metallic structural members, through which substantially all loads in the radial direction are transferred.

The method can further comprise wrapping the inner vessel with a super insulating material to reduce radiant and convective heat transfer.

The method can further comprising allowing the inner vessel to move in the axial direction relative to the outer vessel. This is a feature that has utility for containers that have a long horizontal axis. For smaller vessels the amount of stress caused by differential thermal expansion can be negligible, and it is possible to rigidly attach each end of the inner vessel along the horizontal axis to the outer vessel if more support in the axial direction is required from the non-metallic supports. The method comprises fixedly attaching at least one non-metallic structural member to the inner and outer vessel with an adhesive or with a mechanical joint, or with a combination of adhesives and mechanical joints.

The method can comprise determining a desired design support strength for supporting the inner vessel, calculating the axial and radial load bearing capacity of the conduit and a plurality of other conduits or thermally insulated support sleeves, which all extend between the inner vessel and the outer vessel and that each have functions other than providing structural support for the inner vessel, and sizing one or more non-metallic structural members to provide axial and radial strength equal to the desired design support strength minus the calculated axial and radial load bearing capacity of the conduit and the plurality of conduits or thermally insulated support sleeves.

A particularly well suited application for the method is for storing a liquefied gaseous fuel on-board a vehicle. The capability of this method to be used by an apparatus that is operable on-board a vehicle is significant because the axial and radial loads applied to the support structure can be much more significant compared to the loads that are imposed on a stationary container of similar size. The acceleration, deceleration, and changes in direction that occur in a mobile installation can generate momentum in both the axial and radial directions. The horizontal alignment also results in significant loading in the radial direction, compared to a vertically oriented stationary container where most of the load is carried along the vertical axis.

DETAILED DESCRIPTION OF PREFERRED EMBODIMENT(S)

Figure 1:
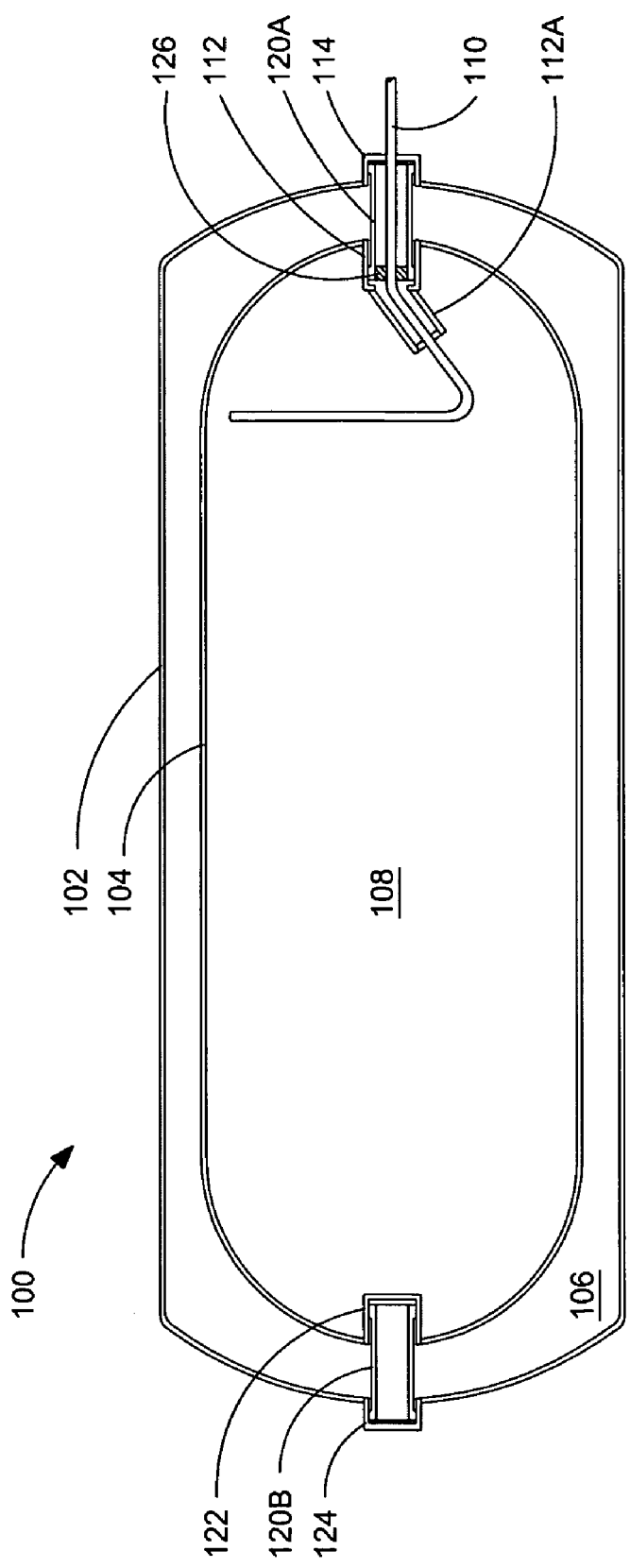
FIG. 1 shows a cross-sectional view of a double-walled container for holding a cryogenic fluid with a support structure for the inner vessel that supports the inner vessel in the axial and radial direction in accordance with the present container for holding a cryogenic fluid.

FIG. 1 is a cross-sectional view of a heat insulated double-walled container 100 for holding a cryogenic fluid. Outer vessel 102 surrounds, and is spaced apart from, inner vessel 104, defining evacuatable space 106 therebetween. Inner vessel 104 also defines the general boundaries of cryogen space 108. In the illustrated embodiment, inner vessel 104 has a cylindrical body with dome-shaped ends. This shape conforms with the general shape of conventional fuel tanks attached to heavy-duty trucks. In the present container for holding a cryogenic fluid, the support system for inner vessel 104 and other shapes could be employed for the inner vessel with the same support system. For example, other shapes such as a sphere or an elongated vessel with an elliptical cross-section can be dictated by the application and the space available for mounting the container. For strength reasons, rounded shapes are preferred compared to shapes with sharp or square corners.

Figure 2:
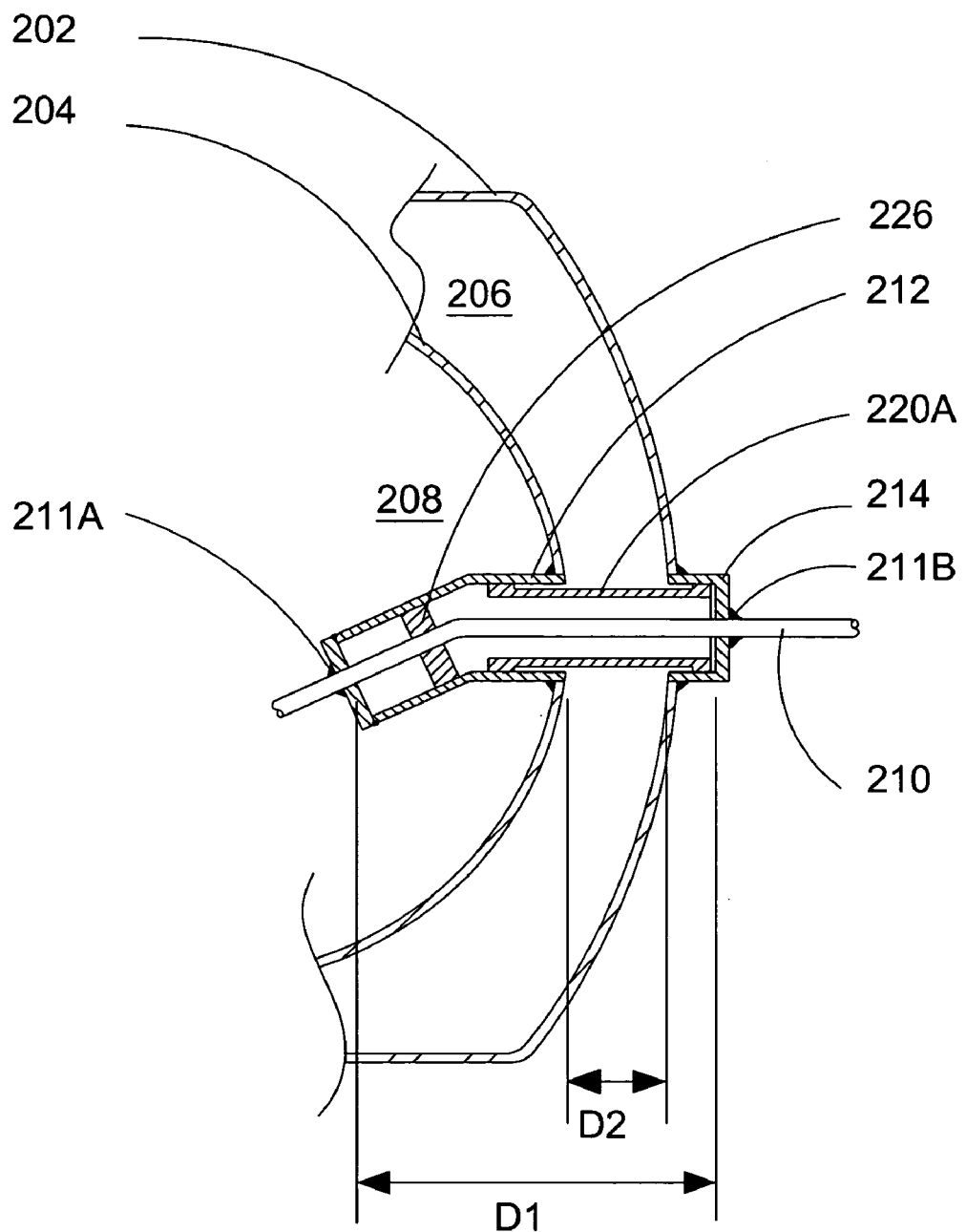
FIG. 2 shows an enlarged cross-sectional view of one end of a container for holding a cryogenic fluid that shows a larger view of an embodiment of a structural support system for suspending an inner vessel within an outer vessel.

As shown in FIG. 1, container 100 has an elongated horizontal axis. The axial loads acting on inner vessel 104 are defined herein to be the loads acting in a direction parallel to the elongated horizontal axis, which defines the "axial direction". To support inner vessel 104 in the axial direction, the structure for supporting inner vessel 104 comprises conduit 110, which extends between inner vessel support bracket 112, associated with inner vessel 104 and outer vessel support bracket 114 associated with outer vessel 102. Conduit 110 is fixedly attached at one point to extension tube 112A, which extends from inner vessel support bracket 112, and at a second point to the bottom of cup-shaped outer vessel support bracket 114. Where conduit 110 penetrates through openings provided in the support brackets conduit 110 fills most of the openings, which are sealed by the connections between conduit 110 and the support brackets. Conduit 110 can be metallic and made from stainless steel or other suitable metals which are well known by persons experienced in the manufacture of cryogenic vessels. By way of example, as shown in FIG. 2, if conduit 110 is metallic it can be joined to the support brackets by respective welds 211A and 211B so that cryogen space 108 and evacuatable space 106 are each fluidly sealed at the connection between conduit 110 and the support brackets.

Metallic components, including inner vessel 104, outer vessel 102, and support brackets 112, 114, 122, and 124 cooperate to define the general boundaries for both cryogen space 108 and evacuatable space 106. Support brackets 112, 114, 122 and 124 can each be welded to the vessels with which each is associated to seal the respective joints therebetween.

Conduit 110 is designed with a wall thickness that is suitable for conveying cryogenic fluid into or out of cryogen space 108, while also providing structural support for carrying a substantial portion of the axial loads acting on inner vessel 104. Accordingly, because conduit 110 acts as both a structural element and a conduit, the wall thickness of conduit 110 is thicker than it would be if it were utilized as only a conduit. Conduit 110 comprises a downward bend to provide a liquid/vapor interface to reduce heat leak that might otherwise occur because of convective currents inside conduit 110. Without the bend, cryogenic fluid within the conduit can flow from the colder end to the warmer end while vapor can flow in the opposite direction resulting in heat leak into the cryogen space. By employing a downward bend, cryogenic fluid is inhibited from flowing up to the warmer end. However, the bend in conduit 110 introduces bending moments to conduit 110 that reduce its structural strength in the axial direction. Some additional axial support can be provided by non-metallic support 120A, which is fixedly attached to inner vessel support bracket 112 and outer vessel support bracket 114, so that a substantial portion of the axial loads can be carried by non-metallic support 120A. Non-metallic support 120A can be fixedly attached to the support brackets by an adhesive bond, or mechanically attached, for example, by means of a threaded connection, a friction or press-fit, a shrink fit, interlocking features or other mechanical means. To facilitate assembly, different means of attachment can be employed at opposite ends of non-metallic support 120A. For example, a mechanical means of attachment can be employed for attaching one end of the non-metallic support 120A and an adhesive can be employed to attach the other end.

To enhance the axial strength of conduit 110, optional support collar 126 can be employed to prevent bending of conduit 110 to counteract bending moments acting thereon. Support collar 126 can provide openings (not shown) to connect the entire interior space defined by support bracket 112 with evacuatable space 106. A drawback of support collar 126 is that it introduces another heat transfer path, but the effect of this can be made negligible by selecting a material for support collar 126 that is a good thermal insulator while also being strong in compression.

Conduit 110 has an open end near the top of cryogen space 108. Configured in this way, conduit 110 can be employed as a fill line and/or a vent line. Valves (not shown) located outside container 100 can be employed to allow conduit 110 to serve in more than one capacity, reducing the need for separate pipes that would provide more heat transfer paths into cryogen space 108. Such valves can be integrated into the body of outer vessel support bracket 114 to reduce the number of connections and to reduce the piping and insulation requirements outside of container 100. An approach to reducing heat leak with the presently disclosed container is to utilize features of the container such as the conduits for more than one purpose and if possible for more than one function, to reduce the number of heat transfer paths as well as the thermal conductivity of the heat transfer paths that do exist between the outside environment and the cryogen space. Conduits are required to convey cryogenic fluid to or from the cryogen space. However, separate conduits are typically used for different purposes, such as filling, draining, and venting, resulting in a plurality of heat transfer paths. That is, the number of heat paths can be reduced by employing a conduit for more than one purpose, such as both filling and venting. In addition, as mentioned above, conventional containers do not take into account the secondary functionality of the conduits as structural supports. This could be because in a larger storage container the structural strength of the conduits is relatively insignificant because of the size of the container versus the size of the conduits, or because bends in the conduits reduce their structural strength to an insignificant value. However, ignoring the structural contribution of the conduit(s) can result in conventional support structures that are stronger than they need to be, resulting in axial supports with larger cross-sectional areas that allow higher thermal conductivity and higher heat leak. Even if the structural contribution of piping is negligible, reducing the number of pipes reduces the number of heat transfer paths, the complexity of the container, and facilitates manufacturing. Accordingly, increasing the wall thickness of one of the conduits to make it into a structural element can be beneficial in a number of ways.

Still with reference to FIG. 1, support for inner vessel in the radial direction is provided by non-metallic supports, which in the illustrated embodiment are depicted by non-metallic supports 120A and 120B, which are both generally tubular in shape with bearing surfaces at each end that cooperate with opposite facing surfaces of cup-shaped support brackets 112, 114, 122 and 124. As indicated above, non-metallic support 120A is fixedly attached to support brackets 112 and 114 so that it can carry axial loads in addition to radial loads. Non-metallic support 120B can have one end with a bearing surface in sliding non-fixed relationship with the associated opposite facing surface of the support bracket to allow movement of inner vessel 104 relative to outer vessel 102. If the length of the container along the longitudinal axis is relatively short so that differential thermal expansion between the inner and outer vessels is not significant, second non-metallic support 120B can also be fixedly attached to its associated support brackets so that non-metallic support 120B can also carry a portion of the axial loads.

In the illustrated embodiment there are two non-metallic supports, but for smaller vessels only one non-metallic support can be employed, and in such an embodiment only non-metallic support 120A would be employed since this allows the same support brackets to cooperate with non-metallic support 120A and conduit 110. For larger containers, the cantilevered weight of the inner vessel becomes difficult to support from one end and employing second non-metallic support 120B becomes more practical, in that lighter supports can be employed with reduced heat leak properties.

FIG. 2, is an enlarged view of a support structure at one end of a double-walled container for holding a cryogenic fluid. Outer vessel 202 surrounds inner vessel 204 and the space between them defines evacuatable space 206. Inner vessel 204 defines cryogen space 208. Conduit 210 extends from outer vessel support bracket 214 to inner vessel support bracket 212. Optional support collar 226 helps conduit 210 to support axial loads by eliminating the bending moment caused by the downward bend in conduit 210. Like support collar 126 shown in FIG. 1, to reduce thermal conductivity from conduit 210 to inner vessel 204, support collar 226 can be made from a material that is strong in compression and also a good thermal insulator. In the embodiment shown by FIG. 2, support collar 226 is positioned on the downward sloping portion of conduit 210. Because support collar 226 is in contact with support bracket 212, the cryogenic fluid contained in cryogen space 208 can cool support collar 226, creating a cold spot at which vapour can condense within conduit 210. Because in this embodiment support collar 226 is positioned on the downward sloping portion of conduit 210, the condensed liquid will flow down the sloped conduit and back into cryogen space 208.

If optional support collar 226 is not employed, other approaches can be employed to provide more strength for supporting the inner vessel in the axial direction. By way of example, to provide more axial support the wall thickness of conduit 210 can be increased, and/or the axial strength of non-metallic support 220A can be increased by increasing its cross-sectional area. To keep thermal conductivity low, the wall thickness of conduit 210 need only be increased and/or reinforced where extra strength is needed to resist bending so that the cross-sectional area can remain smaller where the extra strength is not required.

The enlarged view of FIG. 2 shows some of the features that allow the disclosed support structure to reduce heat leak into cryogen space 208. D1 is the distance between the first point where conduit 210 is directly attached to metallic inner vessel support bracket 212 and the second point where it is attached to outer vessel support bracket 214. Distance D2 is the axial spacing between outer vessel 202 and inner vessel 204 along the axis of conduit 210. Conduit 210 is a thermal conductor so the support system is preferably designed as generally shown in FIG. 2 so that distance D1 is longer than distance D2 to increase the length of the heat transfer path and thereby reduce heat transfer. It is noted that when optional support collar 226 is employed, there is a shorter heat transfer path from conduit 210 to inner vessel support bracket 212, through support collar 226. However, this shorter heat transfer path is still longer than distance D2 and the material for support collar 226 is chosen to have thermal insulating properties so that heat leak is still reduced.

As noted above, while it is desirable to employ a multi-functional conduit to reduce heat leak into cryogen space 208, with the present axial support structure, a plurality of conduits can still be employed if functionally necessary or desirable. A plurality of conduits can be installed parallel to conduit 210 and disposed through hollow non-metallic support 220A.

Figure 3:
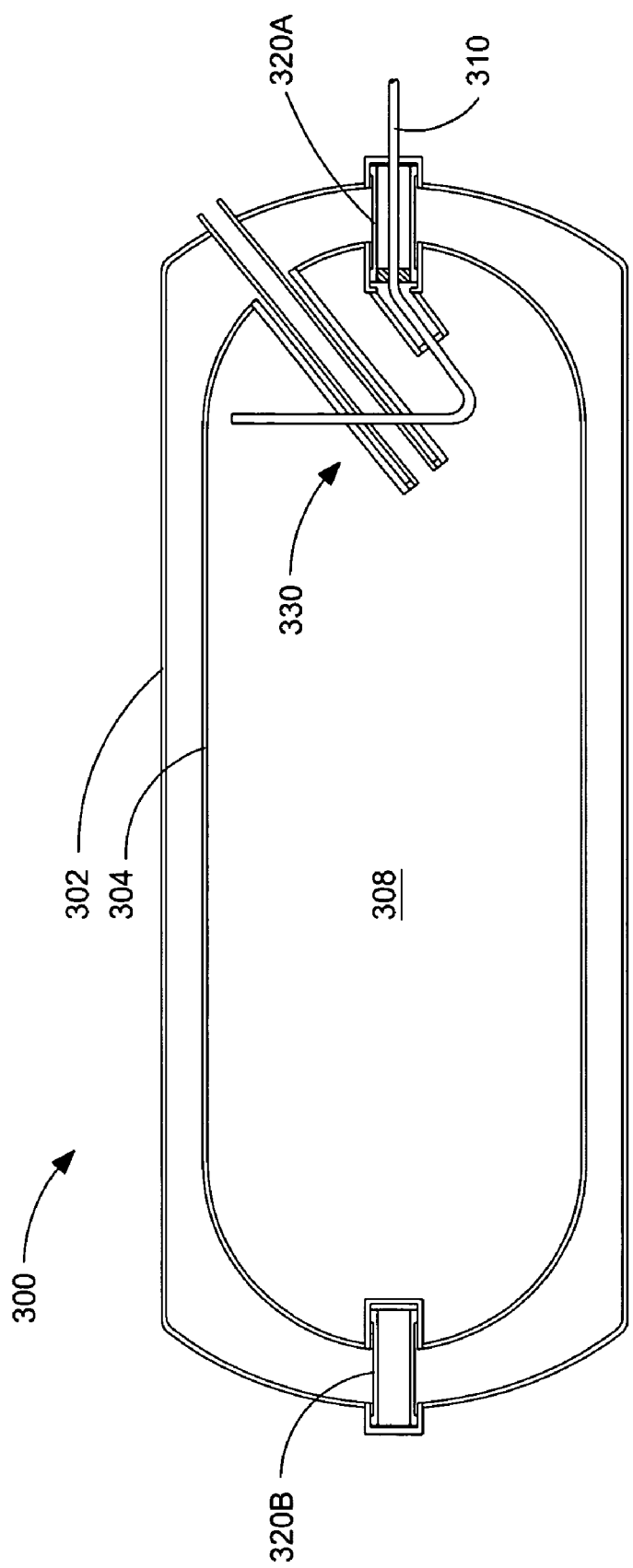
FIG. 3 shows another cross-sectional view of another embodiment of a container for holding a cryogenic fluid that further comprises a thermally insulated sleeve, which contributes some structural support for the inner vessel.

Referring now to FIG. 3, container 300, which comprises outer vessel 302 and inner vessel 304 is an example of yet another preferred embodiment of an improved support structure for a horizontally oriented inner vessel. Like the other embodiments, the container shown in FIG. 3 employs non-metallic supports 320A and 320B that carry substantially all of the radial loads as well as a portion of the axial loads. With some containers for cryogenic fluids, it is desirable to locate the inlet for a pump or a level sensor inside cryogen space 308. The embodiment of FIG. 3 illustrates a container with double-walled sleeve 330, into which a pump or instrumentation can be disposed. In this embodiment, a portion of the axial loads is carried by conduit 310 as well as thermally insulated support sleeve 330. Whereas the radial support structure shown for each of the other embodiments is essentially the same, the strength of the axial support structure for container 300 is designed to take into account the structural support provided by conduits and support sleeves that serve other functions while also providing some structural support for inner vessel 304. Consequently, the strength of the non-metallic supports in the axial direction can be less than the total axial strength required to support inner vessel 304 and if this results in a smaller cross sectional area for the non-metallic supports, heat leak into cryogen space 308 can be reduced.

Accordingly, a container is disclosed with reduced heat leak that utilizes a conduit to carry a substantial portion of axial loads acting along an elongated horizontal axis. The conduit carries substantially none of the radial loads perpendicular to the horizontal axis. The conduit also serves to convey cryogenic fluid into or out of the cryogen space. One or more non-metallic supports are employed to carry substantially all of the radial loads while also contributing to carry a substantial portion of the axial loads acting along the horizontal axis. The non-metallic support preferably has a much lower thermal conductivity compared to a metallic member with the same structural properties. In addition, the heat transfer path through the disclosed support structures is preferably longer than the axial spacing between the inner and outer vessels at the location where support structures are located. The non-metallic support can be disposed entirely in the evacuatable space between the inner and outer vessels so that an all-metallic structure defines the boundaries for the cryogen space and the evacuatable space so that the interfaces between the non-metallic support and the metallic support brackets do not need to be fluid tight.

In some embodiments, the container comprises additional features or elements such as a plurality of conduits or support sleeves for pumps or instrumentation that can also contribute structurally to carry loads in the axial and radial directions for supporting the inner vessel. In the disclosed embodiments, the overall structural strength that is desired is calculated and then the structural capacity of features or elements that have purposes beyond just a structural function are taken into account. By way of example, conduits normally exist as part of a cryogenic container for the purpose of conveying cryogenic fluid into or out of the cryogen space, but the structural capacity of such conduits is normally ignored, but according to the disclosed apparatus and method, this structural capacity is calculated and taken into account. Then the non-metallic supports and the conduit(s) are sized to provide a support structure with a collective strength that is equal to the desired overall structural strength. In this way, it is possible to avoid providing excessive structural strength. Normally, for non-cryogenic applications, excessive structural strength is not problematic, adding only to the cost of the container because of higher than necessary or desirable material costs. For non-cryogenic applications, some excessive structural strength can even be desirable to provide an extra safety factor against failure. However, with cryogenic containers, in addition to higher material costs, excessive structural strength results in higher heat leak and shorter holding times. Therefore, for cryogenic containers it can be more desirable to design a container that has only the strength that is needed for safe and robust operation, without using excessive support structures.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A container for holding a cryogenic fluid, said container comprising:
   (a) an inner vessel defining a cryogen space and having a horizontal elongated axis;
   (b) an outer vessel surrounding said inner vessel, defining an evacuatable space between said outer vessel and said inner vessel; and
   (c) a structure for supporting said inner vessel within said outer vessel, wherein said structure is designed to carry up to a predetermined axial load in a direction parallel to a horizontal axis, and up to a predetermined radial load in directions transverse from said horizontal axis, said structure comprising:
      a conduit attached at a first point to an inner vessel support bracket associated with said inner vessel, and attached at a second point to an outer vessel support bracket for said outer vessel, said conduit carrying a substantial portion of said predetermined axial load and wherein said cryogenic fluid can be conveyed into and/or out of said cryogen space through said conduit;
      at least one non-metallic support spanning between said inner vessel and said outer vessel, said non-metallic support providing a bearing surface associated with respective opposite facing surfaces associated with said inner vessel and said outer vessel for transferring substantially all radial loads transverse to said horizontal axis from said inner vessel to said outer vessel, and wherein said non-metallic support is fixedly attached to said opposite facing surfaces whereby said non-metallic support also carries a portion of said predetermined axial load; and
      wherein the collective axial load carrying capacity of said conduit and said non-metallic support is equal to said predetermined axial load.

2. The container of claim 1 wherein said opposite facing surface associated with said inner vessel is provided by said inner vessel support bracket and said opposite facing surface associated with said outer vessel is provided by said outer vessel support bracket.

3. The container of claim 2 wherein said at least one non-metallic support is tubular in shape and said conduit extends through the hollow interior of said at least one non-metallic support.

4. The container of claim 1 wherein said at least one non-metallic support is a first non-metallic support associated with a first side of said inner vessel that is intersected by said horizontal axis and said container further comprises a second non-metallic support associated with a second side of said inner vessel, opposite to said first side, and said first and second non-metallic supports together are sized to provide the strength needed to carry substantially all of said radial loads.

5. The container of claim 4 wherein said second non-metallic support has at least one bearing surface that is slidable in a direction parallel to said horizontal axis relative to said respective opposite facing surface of said inner or outer vessel, whereby said second non-metallic support provides radial support but not axial support.

6. The container of claim 4 wherein:
   said opposite facing surfaces associated with said first and second sides of said inner vessel are provided by walls of respective cup-shaped inner support structures projecting into said cryogen space;
   said opposite facing surfaces associated with said outer vessel are provided by walls of opposite cup-shaped outer support structures projecting from said outer vessel and aligned with said cup-shaped inner support structures; and
   said first and second non-metallic supports each comprise a cylindrical member with a first end disposed in a respective one of said cup-shaped inner support structures and a second end disposed in a respective one of said cup-shaped outer vessel support structures.

7. The container of claim 6 wherein said cylindrical members are hollow so that they are tubular in shape.

8. The container of claim 7 wherein said conduit extends through one of said cylindrical members.

9. The container of claim 6 wherein said inner vessel support bracket is integrated with said cup-shaped inner support structure.

10. The container of claim 6 wherein said outer vessel support bracket is integrated with said cup-shaped outer support structure.

11. The container of claim 1 wherein said at least one non-metallic support comprises a structural member made from a composite material comprising fibres disposed within a plastic matrix.

12. The container of claim 11 wherein said fibres are selected from the group consisting of glass, carbon, synthetic fibres made from a resin, and quartz.

13. The container of claim 11 wherein said plastic matrix is provided by an epoxy resin.

14. The container of claim 13 wherein said epoxy resin has a cure temperature that is greater than 175° C.

15. The container of claim 11 wherein said plastic matrix comprises bismaleimide.

16. The container of claim 11 wherein said plastic matrix comprises a thermoplastic selected from the group consisting of polyetheretherketone and polyphenylene sulfide.

17. The container of claim 11 wherein said composite material has a TML less than 1 percent.

18. The container of claim 11 wherein said composite material has a CVCM less than 0.1 percent.

19. The container of claim 1 wherein said conduit has a length between said first and second points that provides a heat path between said inner vessel and said outer vessel that is longer than the axial spacing between said inner vessel and said outer vessel.

20. The container of claim 1 wherein said conduit is made from a metallic material and said conduit is welded at said first and second points to said inner vessel support bracket and to said outer vessel support bracket, respectively.

21. The container of claim 1 wherein said conduit spans between said outer vessel and said inner vessel with an alignment that is parallel to said horizontal axis and said conduit bends and slopes downward inside said cryogen space.

22. The container of claim 21 wherein said first point is associated with a location along said conduit where it is sloping downward.

23. The container of claim 21 further comprising a collar support that prevents movement of said conduit in a radial direction near where it bends downwards.

24. The container of claim 23 wherein said collar support is non-metallic.

25. The container of claim 23 wherein said collar support is provided at a location along said conduit where it is sloping downward.

26. The container of claim 1 wherein said at least one non-metallic support has a thermal conductivity less than a substitute support made from a ferrous material with at least the same structural strength.

27. The container of claim 1 where said non-metallic support comprises a thermally insulated support sleeve extending between said outer vessel and said inner vessel, wherein said support sleeve carries a substantial portion of said axial loads.

28. The container of claim 27 wherein said support sleeve comprises:
- an inner tubular wall spaced apart from an outer tubular wall wherein the space between said inner and outer tubular walls is evacuatable together with said evacuatable space between said outer vessel and said inner vessel;
- a distal end disposed within said inner vessel with said inner and outer tubular walls joined together and sealed at or near said distal end whereby cryogenic fluid from within said cryogen space is prevented from flowing into the space between said outer and inner tubular walls; and
- a proximal end associated with said inner vessel and said outer vessel, whereby said inner tubular wall is structurally attached to said outer vessel and said outer tubular wall is structurally attached to said inner vessel.

29. The container of claim 1 wherein said container is mountable on a vehicle, said cryogenic fluid is a combustible fuel, and said container is operable as a fuel tank for supplying fuel to an engine of said vehicle.

30. A container for holding a cryogenic fluid, said container comprising:
- (a) an elongated inner vessel defining a cryogen space and having a horizontal longitudinal axis;
- (b) an outer vessel surrounding said inner vessel, defining an evacuatable space between said outer vessel and said inner vessel;
- (c) a structure for supporting said inner vessel within said outer vessel, wherein said structure is designed to carry up to a predetermined axial load in a direction parallel to a horizontal axis, and up to a predetermined radial load in directions transverse from said horizontal axis, said structure comprising:
    - a metallic conduit extending between an outer vessel support bracket associated with said outer vessel and an inner vessel support bracket associated with said inner vessel, said metallic conduit being fixedly attached to said support brackets and carrying a substantial portion of said predetermined axial load;
    - first and second non-metallic supports associated with opposite first and second sides of said inner vessel, said opposite first and second sides being intersected by said longitudinal axis, said non-metallic supports carrying substantially all loads acting in a radial direction in relation to said longitudinal axis and at least one of said first and second non-metallic supports being fixedly attached to said inner and outer vessels and carrying a portion of said predetermined axial load, each one of said first and second non-metallic supports comprising a non-metallic member extending between said inner vessel and said outer vessel, said non-metallic members each comprising bearing surfaces associated with respective opposite facing surfaces of support structures associated with said inner vessel and said outer vessel; and
    - wherein the collective axial load carrying capacity of said conduit and said non-metallic supports is equal to said predetermined axial load.

31. The container of claim 30 wherein said conduit is fixedly attached to said outer vessel support bracket near said longitudinal axis and the distance between the point where said metallic conduit is fixedly attached to said inner vessel support bracket and the point where said metallic conduit is fixedly attached to said outer vessel support bracket is greater than the distance along the longitudinal axis between said inner vessel and said outer vessel in the proximity of a location where said longitudinal axis intersects said outer vessel.

* * * * *